United States Patent [19]
Yasunaga

[11] Patent Number: 5,737,556
[45] Date of Patent: Apr. 7, 1998

[54] DOCUMENT MANAGEMENT SYSTEM FOR DISPLAYING AND SHIFTING A PLURALITY OF REGIONS

[75] Inventor: Fumiaki Yasunaga, Fukuoka, Japan

[73] Assignee: Matsushita Electric Industrial Co., Ltd., Osaka, Japan

[21] Appl. No.: 562,120

[22] Filed: Nov. 22, 1995

Related U.S. Application Data

[62] Division of Ser. No. 309,739, Sep. 21, 1994, abandoned.

[30] Foreign Application Priority Data

Sep. 27, 1993 [JP] Japan ................... 5-239696

[51] Int. Cl.$^6$ ...................................... G06F 3/00
[52] U.S. Cl. ................. 395/339; 395/968; 395/607
[58] Field of Search .......................... 395/155–161, 395/600, 339, 348, 968, 607, 614

[56] References Cited

U.S. PATENT DOCUMENTS

| | | | |
|---|---|---|---|
| 3,931,612 | 1/1976 | Slevens et al. | 395/607 |
| 4,665,555 | 5/1987 | Alker et al. | 382/305 |
| 5,062,045 | 10/1991 | Janis et al. | 395/609 |
| 5,312,478 | 5/1994 | Reed et al. | 395/148 |
| 5,317,732 | 5/1994 | Gerlach, Jr. et al. | 395/600 |
| 5,444,841 | 8/1995 | Glaser et al. | 395/149 |

OTHER PUBLICATIONS

Côté, R. G., et al, "Profiles in Document Managing," BYTE, Sep. 1992, pp. 198–212.

*Primary Examiner*—Raymond J. Bayerl
*Assistant Examiner*—A. Katbab
*Attorney, Agent, or Firm*—Watson Cole Stevens Davis, P.L.L.C.

[57] ABSTRACT

A document management system in which a list of sorting information displayed on a display for sorting document data into corresponding individual files of the document data can be changed as desired by the user. File names ("internal medicine", "pediatry", etc. ) set in a file management table are displayed in rectangular zones of a window displayed on the display. When the user desires to change the arrangement of the displayed file names, he specifies the rectangular zone from which one file name is to be shifted and another rectangular zone to which that file name is to be shifted. By so specifying, a file location table provided for management of the displayed file arrangement is changed to change the arrangement of the file names displayed in the window.

8 Claims, 11 Drawing Sheets

FIG. 4

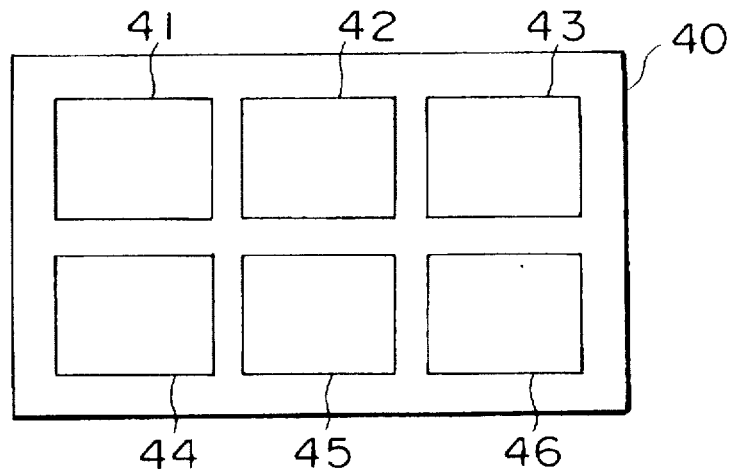

FIG. 5

FILE LIST DISPLAY INFORMATION 50

| | |
|---|---|
| ADDRESS NO. 0 | DISPLAYED POSITION AND SIZE OF RECTANGLE 41 |
| ADDRESS NO. 1 | DISPLAYED POSITION AND SIZE OF RECTANGLE 42 |
| ADDRESS NO. 2 | DISPLAYED POSITION AND SIZE OF RECTANGLE 43 |
| ADDRESS NO. 3 | DISPLAYED POSITION AND SIZE OF RECTANGLE 44 |
| ADDRESS NO. 4 | DISPLAYED POSITION AND SIZE OF RECTANGLE 45 |
| ADDRESS NO. 5 | DISPLAYED POSITION AND SIZE OF RECTANGLE 46 |

FIG. 6

FILE LOCATION TABLE 11

| | |
|---|---|
| ADDRESS NO. 0 | FILE ID |
| ADDRESS NO. 1 | FILE ID |
| ADDRESS NO. 2 | FILE ID |
| ADDRESS NO. 3 | FILE ID |
| ADDRESS NO. 4 | FILE ID |
| ADDRESS NO. 5 | FILE ID |

- 41: INTERNAL MEDICINE
- 42: GYNECOLOGY
- 43: PEDIATRY
- 44: OTO-LARYNGOLOGY
- 45: SURGERY
- 46: PSYCHIATRY
- 40

FILE MANAGEMENT TABLE — 12

- "1" INTERNAL MEDICINE
- "2" GYNECOLOGY
- "3" PEDIATRY
- "4" OTOLARYNGOLOGY
- "5" SURGERY
- "6" PSYCHIATRY

FILE COCATION TABLE

| | |
|---|---|
| ADDRESS NO. 0 | "1" |
| ADDRESS NO. 1 | "2" |
| ADDRESS NO. 2 | "3" |
| ADDRESS NO. 3 | "4" |
| ADDRESS NO. 4 | "5" |
| ADDRESS NO. 5 | "6" |

11

FILE MANAGEMENT TABLE

FILE MANAGEMENT TABLE

1

DOCUMENT MANAGEMENT SYSTEM FOR DISPLAYING AND SHIFTING A PLURALITY OF REGIONS

This is a division of application Ser. No. 08/309,739 filed Sep. 21, 1994 now abandoned.

BACKGROUND OF THE INVENTION

This invention relates to a document management system, such as, an electronic filing system, and more particularly to a document management system in which the user can freely change the arrangement of sorted file names displayed in the form of a list on a display.

DESCRIPTION OF THE RELATED ART

In a document management system, such as, a conventional electronic filing system, document data can be registered in a large-capacity memory, such as, an optical disk while adding sorted file names or document names to the document disk.

The document data registered once in such a memory can be retrieved by the use of the sorted file names added at the time or registration. At the time of retrieval, a window 40 for displaying a list of the file names as shown in FIG. 11A is displayed on a display, so that the file names pre-set in rectangular zones 41 to 46 respectively of the window 40 are displayed. When the user specifies the desired file name by the use of an input device, such as, a mouse, a list of the names of the documents corresponding to the specified file name are displayed.

However, in the case of the prior art document management system, the file names have been regularly displayed in the predetermined rectangular zones in the primarily determine order. Therefore, the prior art document management system has had such a problem that, even when the file names are increased, the file names can only be displayed at the predetermined positions, and those showing a high frequency of use and those showing a low frequency of use are not orderly displayed. The prior art document management system has had such another problem that, when the file name is specified at the time of retrieval and registration of the document data, the file name showing a high frequency of use may be displayed at a position relatively difficult to detect, while the file name showing a low frequency of use may be displayed at a position relatively easy to detect, resulting in difficulty of specifying the file name.

With a view to solve the prior art problems pointed out above, it is an object of the present invention to provide a document management system in which the user can easily change the arrangement of displayed file names.

SUMMARY OF THE INVENTION

According to a first aspect of the present invention which solves the prior art problems, there is provided a document management system comprising: document data memory means for storing document data; document file information memory means for storing document file information used for sorting the document data into corresponding individual files of the document data respectively; document registration/retrieval means for specifying the document file information stored in the document file information memory means to store document data in the document data memory means and for retrieving document data stored in the document data memory means; display means; a display management table for displaying, on the display means, a list of the document file information stored in the document file information memory means; display control means for displaying, on the display means, the list of the document file information store din the document file information memory means on the basis of the display management table; and changing means for changing the display management table.

According to a second aspect of the present invention, there is provided a document management system comprising: display means capable of displaying a plurality of regions; specifying means for specifying the regions displayed by the display means; memory means for storing the information corresponding to the region specified first by the specifying means; and shifting means for shifting the region specified first by the specifying means to the position of the region specified second by the specifying means.

According to a third aspect of the present invention, there is provided a document management system comprising: display means capable of displaying a plurality of closed regions; specifying means for specifying the closed regions displayed by the display means; memory means for storing the information corresponding to the closed region specified first by the specifying means, and shifting means for shifting the closed region specified first by the specifying means to the position of the closed region specified second by the specifying means.

According to a fourth aspect of the present invention, there if provided a document management system comprising: display means capable of displaying a plurality of regions; specifying means for specifying the regions displayed by the display means; memory means for storing the information corresponding to the region specified first by the specifying means; shifting means for shifting the region specified first by the specifying means to the position of the region specified second by the specifying means; and second shifting means for shifting the region located between the address of the region specified first by the specifying means and that of the region specified second by the specifying means and also shifting the region specified second by the specifying means.

According to a fifth aspect of the present invention, there is provided a document management system comprising: display means capable of displaying a plurality of regions; specifying means for specifying the regions displayed by the display means; memory means for storing the information corresponding to the region specified first by the specifying means; shifting means for shifting the region specified first by the specifying means to the position of the region specified second by the specifying means; and second shifting means operating, when the address of the region specified first by the specifying means is smaller than the address of the region specified second by the specifying means, to shift the regions having addresses located between the address of the region specified first by the specifying means and the address of the region specified second by the specifying means and also the region specified second by the specifying means in the one-address decreasing direction respectively.

According to a sixth aspect of the present invention, there is provided a document management system comprising: display means capable of displaying a plurality of regions; specifying means for specifying the regions displayed by the display means; memory means for storing the information corresponding to the region specified first by the specifying means; shifting means for shifting the region specified first by the specifying means to the position of the region specified second by the specifying means; and second shifting means operating, when the address of the region specified first by the specifying means is larger than the address of the region specified second by the specifying means, to shift the regions having addresses located between the address of the region specified first by the specifying means and the address of the region specified second by the specifying means and also the region specified second by the specifying means in the one-address increasing direction respectively.

In the document management system of the present invention having the features described above, the user can thus easily change the contents of the list of document data displayed on the display.

BRIEF DESCRIPTION OF THE DRAWINGS

FIG. 4 shows an example of a window for displaying a list of sorted file names in the embodiment.

FIG. 5 shows the arrangement of file name list display information in the embodiment.

FIG. 6 shows the arrangement of file ID's in the file location table in the embodiment.

DESCRIPTION OF THE PREFERRED EMBODIMENTS

Preferred embodiments of the present invention will now be described by reference to the drawings.

Figure 1:
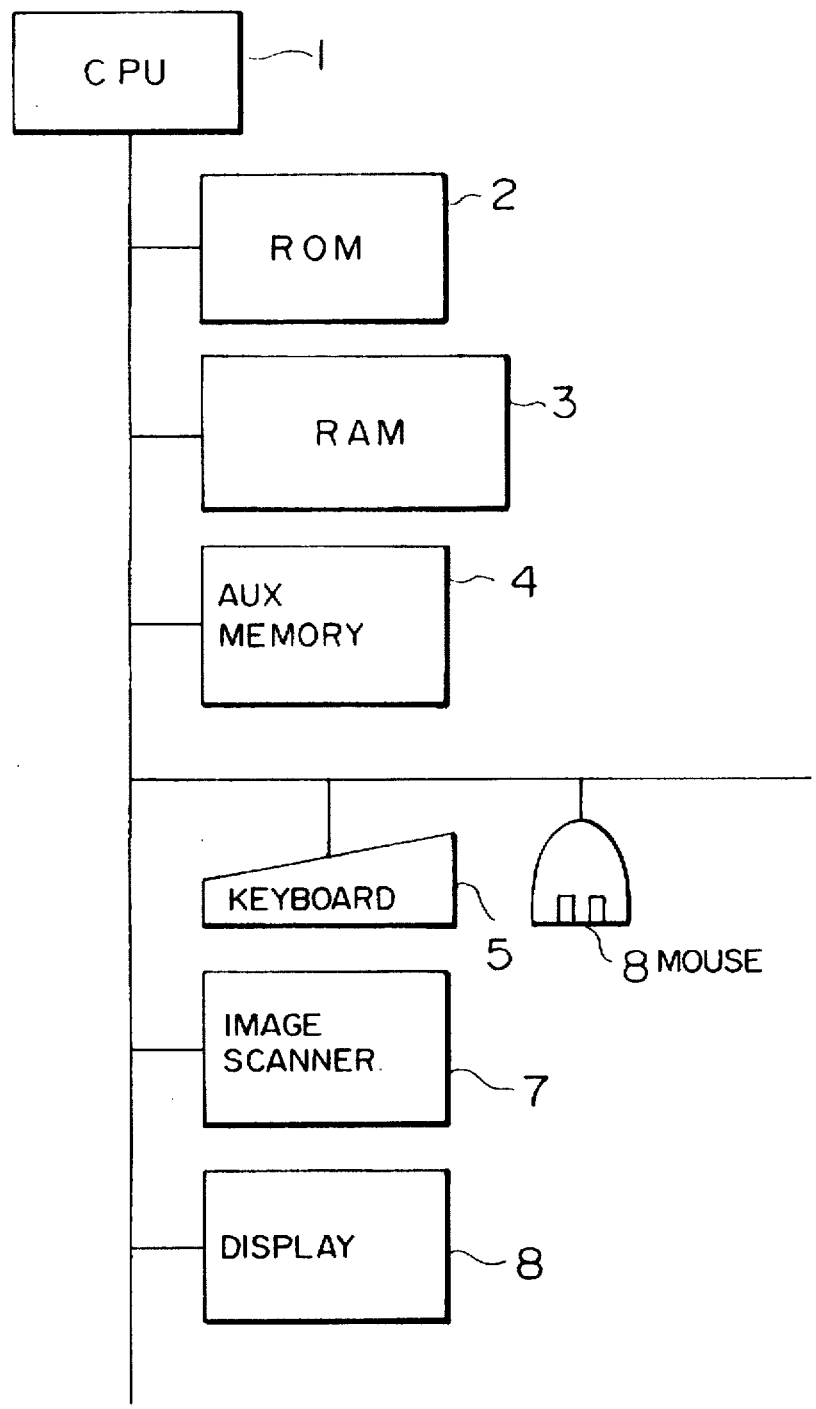
FIG. 1 is a block diagram showing the structure of an embodiment of the document management system according to the present invention.
Figure 2:
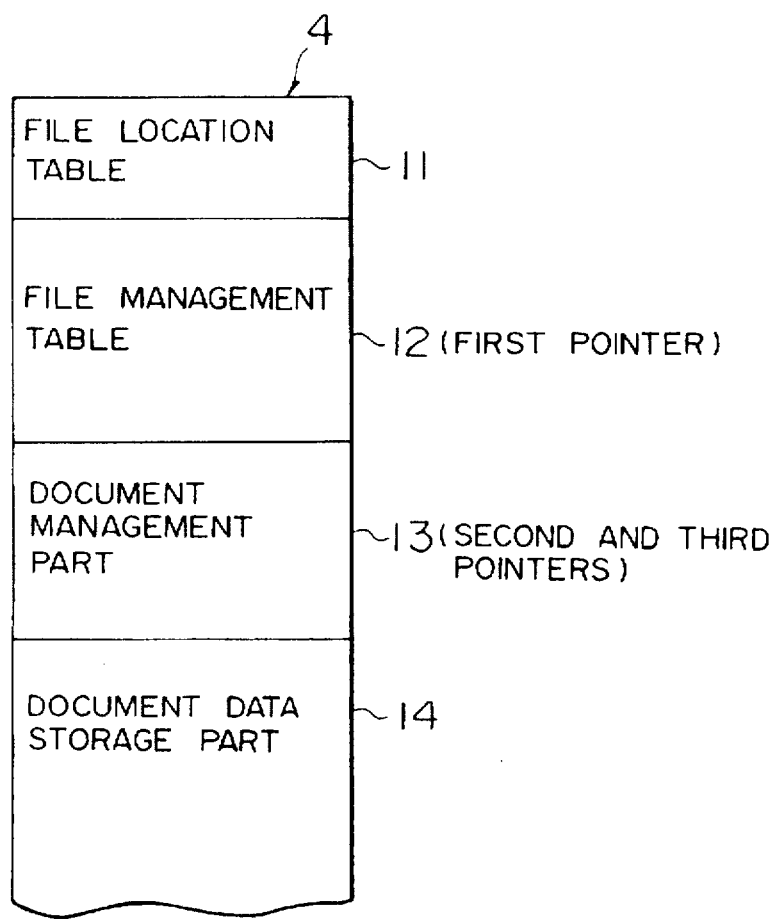
FIG. 2 shows the arrangement of data stored in the auxiliary memory unit shown in FIG. 1.
Figure 3:
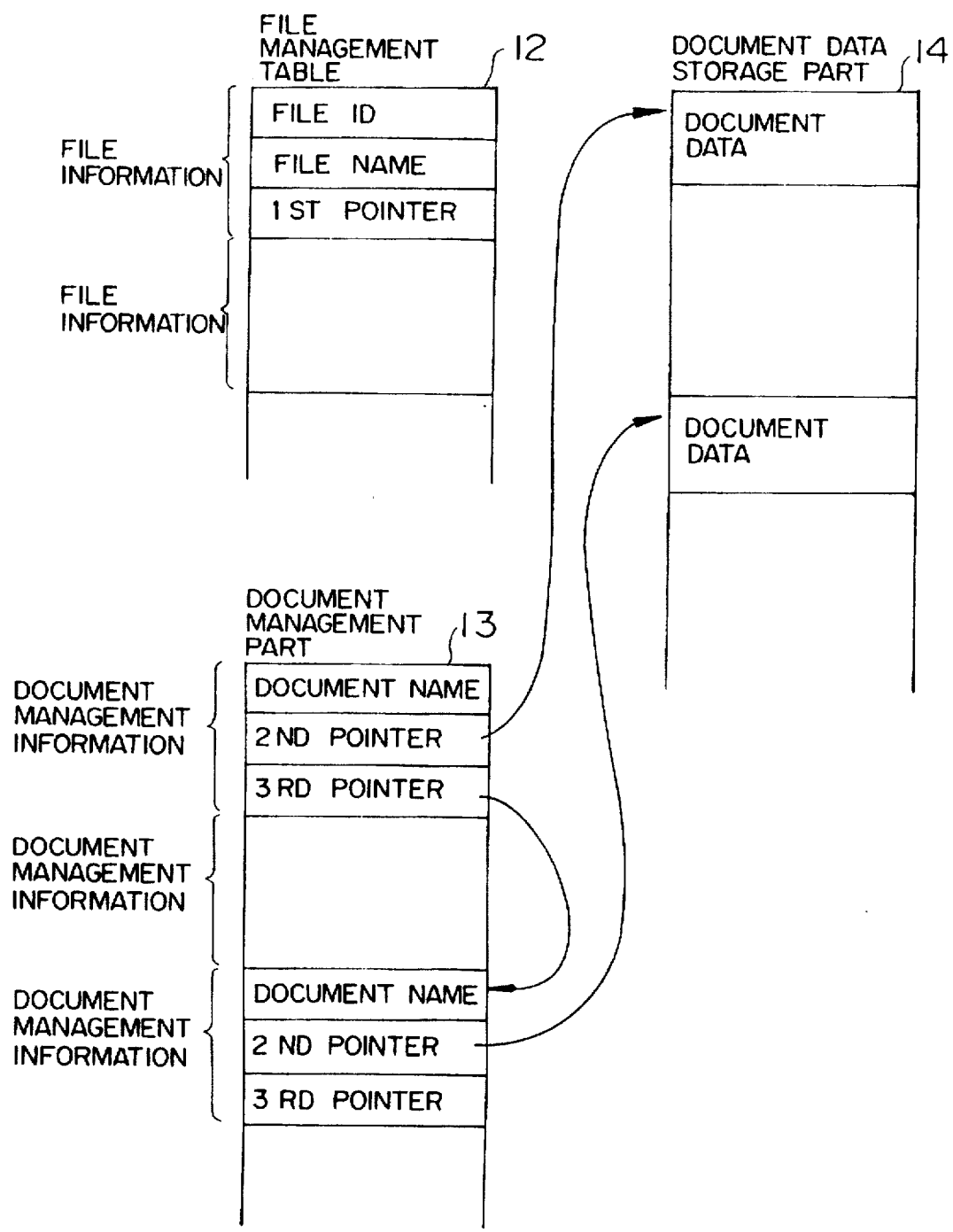
FIG. 3 shown in more detail the arrangement of the data stored in the auxiliary memory unit shown in FIG. 1.

FIG. 1 is a block diagram showing the structure of an embodiment of the document management system of the present invention, FIG. 2 shows the arrangement of data in the auxiliary memory unit in the embodiment shown in FIG. 1, and FIG. 3 shows in more detail the arrangement of data in the auxiliary memory unit. Referring now to FIG. 1, the document management system embodying the present invention comprises a CPU 1 executing control of various units and processing various kinds of data according to process stored in a ROM 2, a RAM 3 storing various kinds of data, the auxiliary memory unit 4 in the form of a recording medium, such as, a magneto-optical disk storing data, such as, document data, a keyboard 5, a mouse 6, an image scanner 7 optically reading out from, for example, an original document and converting the read-out document data into an electrical signal, and a display 8, such as, a CRT of a liquid crystal display for displaying data.

As shown in FIG. 2, a file location table 11, a file management table 12, a document management part 13 and a document data storage part 14 are set in the auxiliary memory unit 4 shown in FIG. 1. As shown in FIG. 3, the file management table 12 includes a plurality of sorting or file information corresponding to a plurality of file names selected by the user respectively. That is, the table 12 includes file information as many as the number of file names selected by the user.

The document management part 13 includes a plurality of document management information corresponding to individual document data (image data read out by the image scanner 7) stored in the document data storage part 14.

Each of the file information in the file management table 12 includes a file ID, a file name and a first pointer used for shift to document management information stored in the document management part 13. The first pointer is used for storage of the position where document management information regarding a document first registered during sorting is stored. The file ID is a serial number added to each file information in the order of selection of the file names by the user. Therefore, when the user selects six file means, six file information are set in the file management table 12, and the file ID's "1" to "6" are added to the six file information respectively.

Each of the document arrangement information in the document management part 13 includes a document name added to each document, a second pointer used for displaying document data stored in the document data storage part 14, and a third pointer used for shift from presently displayed document management information to the document management information to be displayed next.

Accordingly, the individual document management information in the document management part 13 are connected by the second pointer to the corresponding document data in the document data storage part 14, and a plurality of document management information belonging to the same file are connected to each other by the third pointers.

When the first pointer in the file information in the file management table 12 is selected, the first document management information among those in the document management part 13 is specified. That is, among a plurality of document management information belonging to the same file, the document management information registered first is specified. Therefore, when the file name is specified, all the documents corresponding to the file name can be retrieved.

Figures 9A, 9B, 9C:
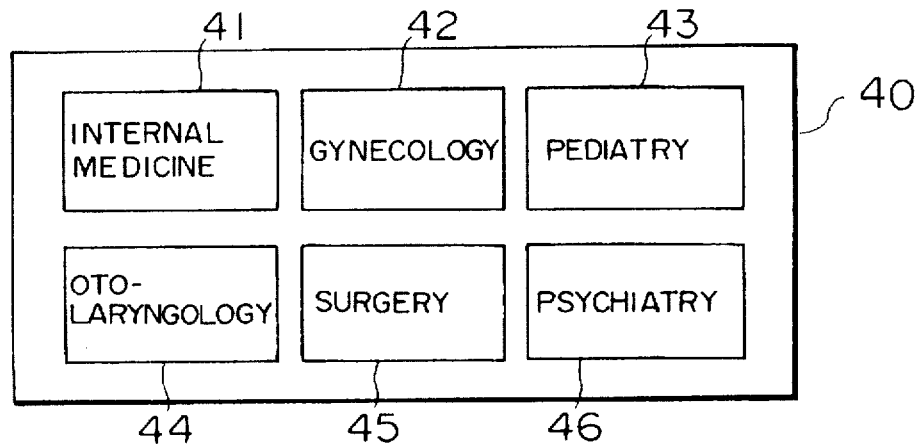
FIGS. 9A, 9B and 9C show an example of the file name list display in the window and corresponding arrangements of data in the file management table and the file location table in the embodiment respectively.

When the document data registered in the auxiliary memory unit 4 shown in FIG. 1 are retrieved according to the sorting, a list of the file names are displayed in a window 40 on the display 8 as shown in FIGS. 9A to 9C. In this window 40, rectangular zones 41 to 46 as shown in FIG. 4 are displayed according to file list display information 50 registered in the ROM 2. FIG. 5 shows the contents of the file list display information 50. As shown in FIG. 5, the file list display information 30 stores the displayed positions and sizes of the rectangular zones 41 to 46 in the window 40.

According to the contents of the file location table 11 in the auxiliary memory unit 4, the file names are displayed in the rectangular zones 41 to 46 in the window 40 under control of the CPU 1. As shown in FIGS. 3 an 6, the file ID's of the file information in the file management table 12 are registered in the file location table 11. In the file list display information 50 shown in FIG. 5 and the file location table 11 shown in FIG. 6, the head address is stored in the CPU 1, and the relative address from the head address (the address No. 0 to the address No. 5 in FIGS. 5 and 6) is based for the management of the internal data.

At each address, each of the rectangular zones 41 to 46 in the window 40, each of the information regarding the rectangular zones 41 to 46 in the file list display information 50 and each of the file ID's have a 2:1 correspondence among them. Thus, when the user desires to retrieve the document data, he specifies by the mouse 6 one of the rectangular zones 41 to 46 in the window 40 in which the file names are displayed. The CPU 1 checks the file list display information 50 shown in FIG. 5 to detect the rectangular zone specified by the user, and, on the basis of the file list display information 50, acquires the relative address where the information corresponding to the specified rectangular zone is stored.

Then, on the basis of the acquired relative address, the file ID registered in the file location table 11 shown in FIG. 6 is acquired, and, on the basis of the file information corresponding to the file ID, the corresponding document is retrieved.

Figure 7:
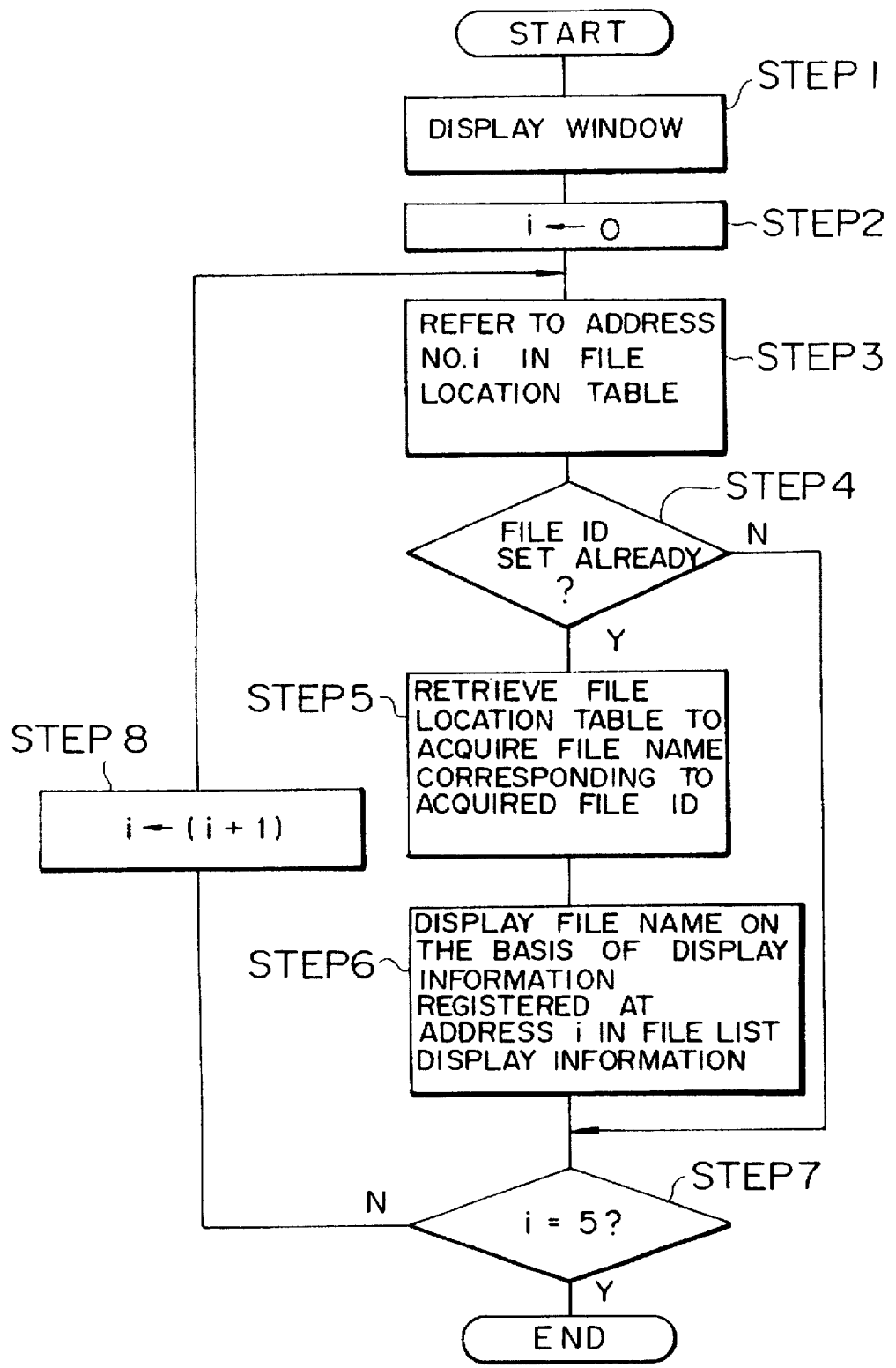
FIG. 7 is a flow chart of processing for file name list display in the embodiment.

The operation of the embodiment of the document management system according to the present invention will now be described by reference to flow charts shown in FIGS. 7 and 8.

Steps of processing for displaying a list of file names on the display 8 in the case of registration or retrieval of document data will be first described. In a step 1 in FIG. 7, the CPU 1 makes reference to the file list display information 50 to display the window 40 and the rectangular zones 41 to 46 at the predetermined positions on the display 8 as shown in FIG. 4. In a step 2, a variable i used as an address counter is initialized to "0", and step 2 is followed by steps of routine processing from a step 3 to a step 8.

In the step 3 in the routine processing, the CPU 1 makes reference to an address No. 1 which is the relative address in the file location table 11. When the CPU 1 detects in the step 4 that the file ID is set at the address No. i, the file ID set at the address No. i is used in the step 5 to retrieve the file management table 12 thereby acquiring the file name corresponding to the detected file ID. After the file name is acquired, the file name is displayed in the corresponding rectangular zone in the step 6 on the basis of the display information registered at the address No. i in the file list display information 50.

On the other hand, when the CPU detects in the step 4 that the file ID is not set at the address No. i, whether or not the file ID is not set at the address No. (i+1) is detected. In this manner, the file location table 11 is successively referenced in the steps 7 and 8 until the address No. 5 represents the relative address.

In the manner described above, the sequence of processing from the step 3 to the step 6 is repeated while updating the variable i in the step 8 until the condition specified in the step 7 is satisfied (that is, until all the data in the file location table 11 are processed). Thus, the file names corresponding to the respective rectangular zones 41 to 46 are successively displayed.

Steps of processing for changing the arrangement of the file names displayed in the respective rectangular zones 41 to 46 in the window 40 shown in FIG. 9A will now be described.

Figure 8:
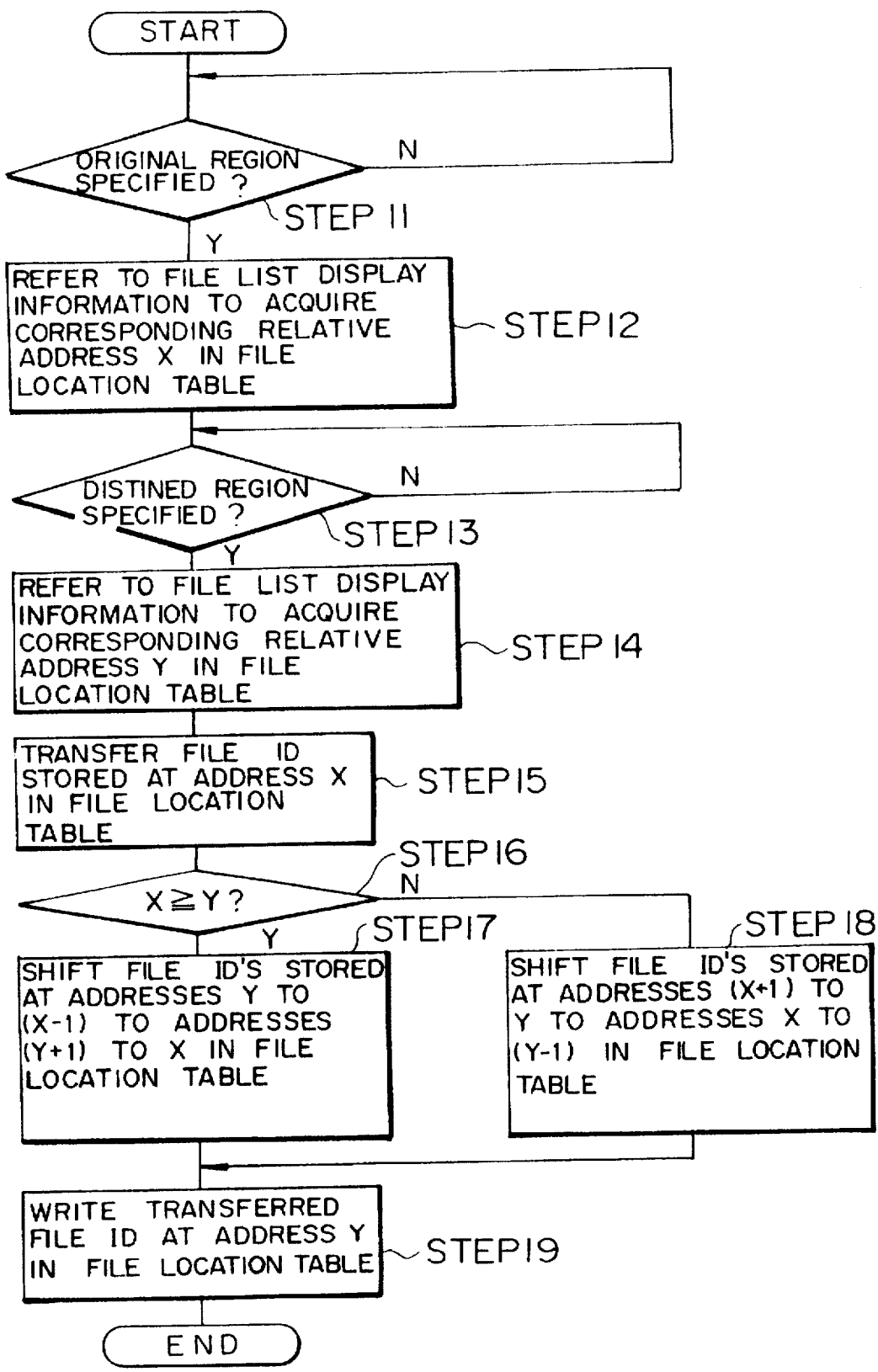
FIG. 8 is a flow chart of processing for changing the file location table in the embodiment.

In a step 11 in FIG. 8, the file name desired to be shifted from one rectangular zone to another among those 41 to 46 displayed in the window 40 is specified by the user manipulating the keyboard 5 or the mouse 6. Then, in a step 12, the CPU 1 makes reference to the file list display information 50 so as to acquire the relative address X of that rectangular zone in the file location table 11. After the relative address X of the rectangular zone from which the file name is shifted is acquired, the CPU 1 stands by in a step 13 until the rectangular zone to which the file name is to be shifted is specified.

When the rectangular zone to which the file name is to be shifted in the window 40 is specified, the CPU 1 makes reference to the file list display information 50 in a step 14 to acquire the relative address Y corresponding to the rectangular zone to which in the file name is to be shifted. Then, in a step 15, the file ID stored at the address No. X in the file location table 11 is transferred to a buffer 100 in the RAM 3, and the relative address X of the rectangular zone from which the file name is shifted and the relative address Y of the rectangular zone to which the file name is to be shifted are compared in a step 16 to detect their relative magnitude.

When the result of comparison in the step 16 proves that the relative address X of the former rectangular zone is larger than the relative address Y of the latter rectangular zone, that is, when the order of the former rectangular zone is forward relative to that of the latter rectangular zone, the file ID's registered in the file location table 11 at the positions of from the address No. Y to the address No. (X−1) are shifted in one-address increasing directing in a step 17, that is, shifted to the positions of from the address No. (Y+1) to the address No. X, respectively. On the other hand, when the result of comparison in the step 16 proves that the relative address X of the former rectangular zone is smaller than the relative address Y of the latter rectangular zone, that is, when the order of the former rectangular zone, is backward relative to that of the latter rectangular zone, the file ID's registered in the file location table 11 at the positions of from the address No. (X+1) to the address Y are shifted in one-address decreasing direction in a step 18, that is, shifted to the positions of from the address No. X to the address No. (Y−1), respectively.

After execution of the processing in the step 17 or 18, the file ID transferred to the buffer 100 in the step 15 is written at the address No. Y in the file location table 11 in a step 19, thereby ending the processing for changing the displayed position of the file name.

A practical example of the manner of changing the displayed position of the file name will now be described.

Suppose now that the file names "internal medicine", "gynecology", "pediatry", "otolaryngology", "surgery" and "psychiatry" are displayed in the rectangular zones 41 to 46 in the window 40 respectively as shown in FIG. 9A. Together with the above display, the file ID's "1" to "6" and the corresponding file names are set in the file management table 12 as shown in FIG. 9B. Also, the file ID's are set in the file location table 11 as shown in FIG. 9C.

First, description will be given by reference to the case where the result of comparison in the step 16 in FIG. 8 proves that the relative address X of the rectangular zone from which the file name is to be shifted is larger than the relative address Y of the rectangular zone to which the file name is to be shifted, that is, when the order of the former rectangular zone is forward relative to that of the latter rectangular zone.

When the file name "surgery" displayed in the rectangular zone 45 is desired to be shifted to the rectangular zone 42, the mouse 6 is used to specify the former rectangular zone 45 and the latter rectangular zone 42. As a result, in the file location table 11 shown in FIG. 9C, the file ID "5" at the address No. 4 corresponding to the rectangular zone 45 is acquired as the relative address X of the former rectangular zone, while the file ID "2" at the address No. 1 corresponding to the rectangular zone 42 is acquired as the relative address Y of the latter rectangular zone.

Figure 10A:
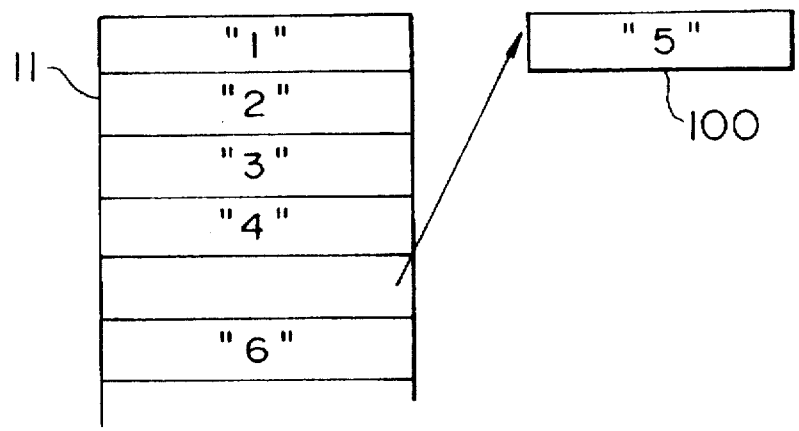
FIGS. 10A, 10B and 10C illustrate the processing for changing the file location table in the embodiment.
Figure 10B:
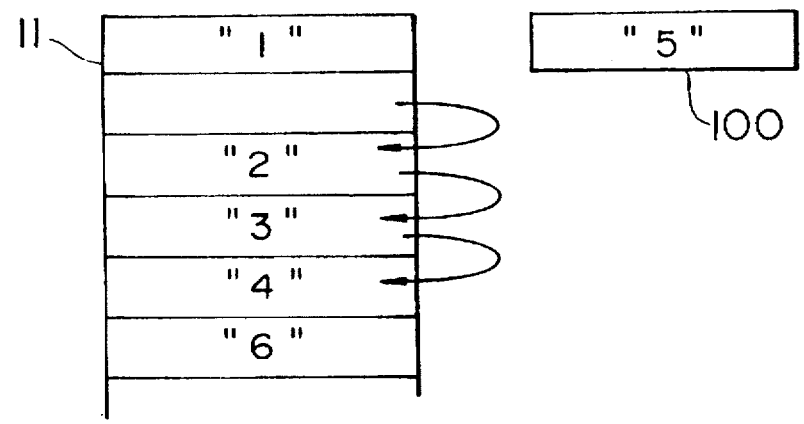
Figure 10C:
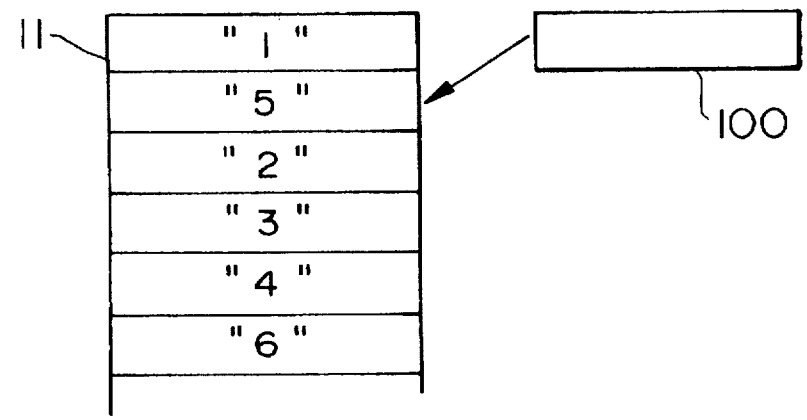

Then, as shown in FIG. 10A, the file ID "5" set at the address No. 4 that is the relative address X in the file location table 11 is transferred to the buffer 100 in the RAM 3. Then, as shown in FIG. 10B, the file ID's set at the addresses Nos. 1 to 3 are shifted to the addresses Nos. 2 to 4 so that the position corresponding to the address No. 1 of the latter rectangular zone is evacuated. Finally, as shown in FIG. 10C, the file ID "5" transferred to the buffer 100 in the RAM 3 is written at the address No. 1 that is the relative address Y of the latter rectangular zone, thereby ending the processing.

Figure 11A:
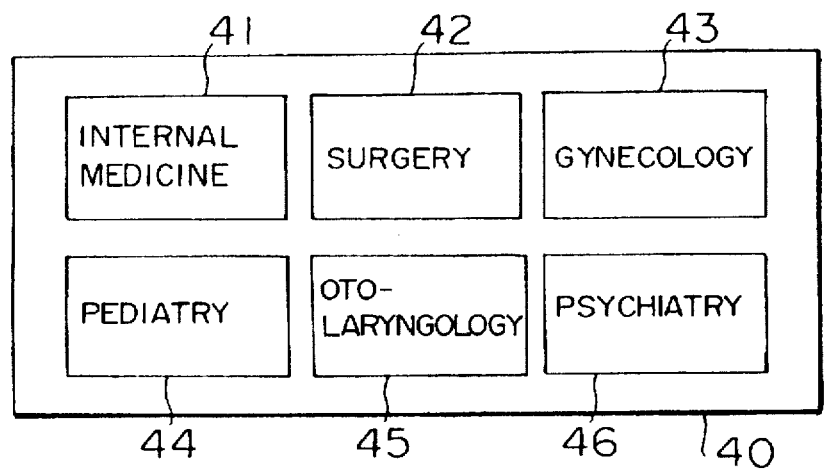
FIGS. 11A and 11B show and example of the file name display in the embodiment.
Figure 11B:
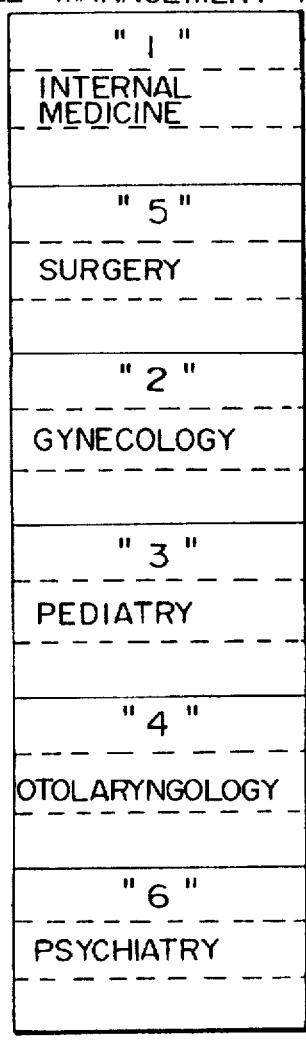

After the file location table 11 is renewed, the file names are displayed in the window 40 according to the new file location table 11 as shown in FIG. 11A. It will be seen that the file name "surgery" is displayed in the rectangular zone 42, and the file names "gynecology", "pediatry" and "otolaryngology" are displayed in the rectangular zones 43 to 45 respectively. At the same time, the file ID's "1" to "6" are also correspondingly changed in the file management table 12 as shown in FIG. 11B.

Description will now be given by reference to the case where the result of comparison in the step 16 in FIG. 8 proves that the relative address X of the rectangular zone from which the file name is to be shifted is smaller than the relative address Y of the rectangular zone to which the file name is to be shifted, that is, when the order of the former rectangular zone is backward relative to that of the latter rectangular zone.

When, for example, it is desired to shift the file name "internal medicine" displayed in the rectangular zone 41 in FIG. 9A to the rectangular zone 44, the mouse 6 is used to specify the former rectangular zone 41 and the latter rectangular zone 44. As a result, in the file location table 11 shown in FIG. 9C, the file ID "1" at the address No. 0 corresponding to the rectangular zone 41 is acquired as the relative address X of the former rectangular zone, while the file ID "4" at the address No. 3 corresponding to the rectangular zone 44 is acquired as the relative address Y of the latter rectangular zone.

Figure 12A:
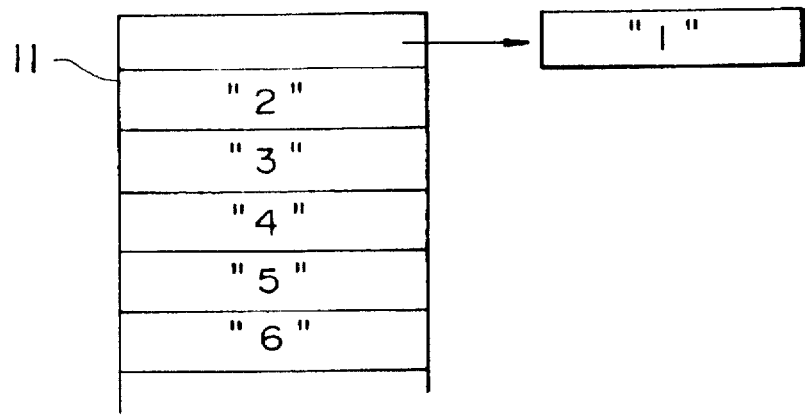
FIGS. 12A, 12B and 12C illustrate the processing for changing the file location table in the embodiment.
Figure 12B:
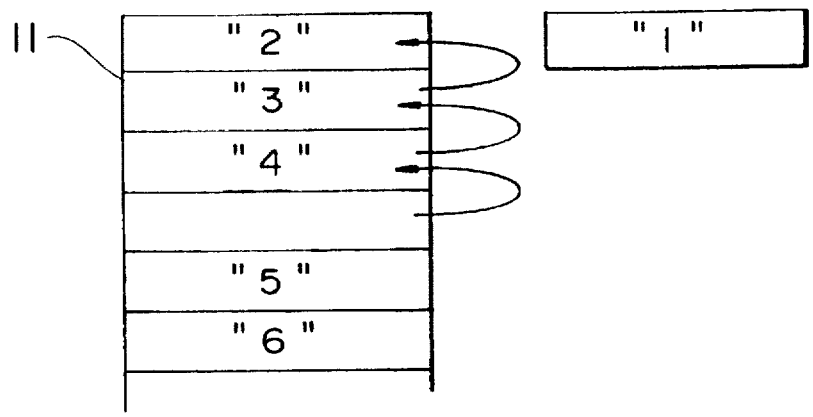
Figure 12C:
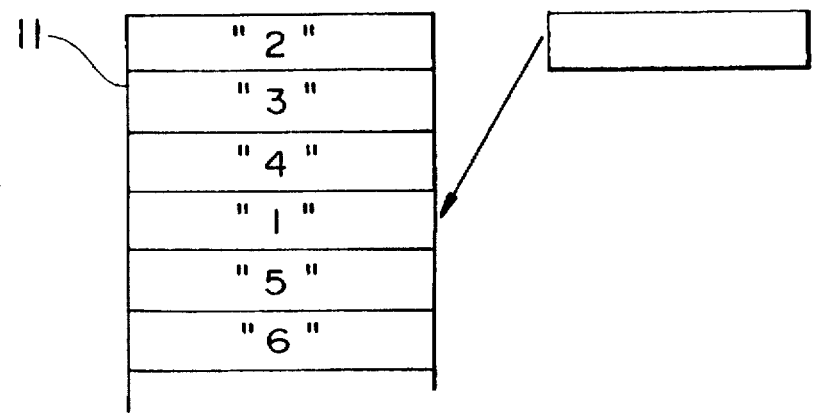

Then, as shown in FIG. 12A, the file ID "1" set at the address No. 0 that is the relative address X of the former rectangular zone in the file location table 11 is transferred to the buffer 100 in the RAM 3. Then, as shown in FIG. 12B, the file ID's set at the addresses Nos. 1 to 3 are shifted to the addresses Nos. 0 to 2 so that the position corresponding to the address No. 3 of the latter rectangular zone is evacuated. Finally, as shown in FIG. 12C, the file ID transferred to the buffer 100 in the RAM 3 is written at the address No. 3 that is the relative address Y of the latter rectangular zone, thereby ending the processing.

Figure 13A:
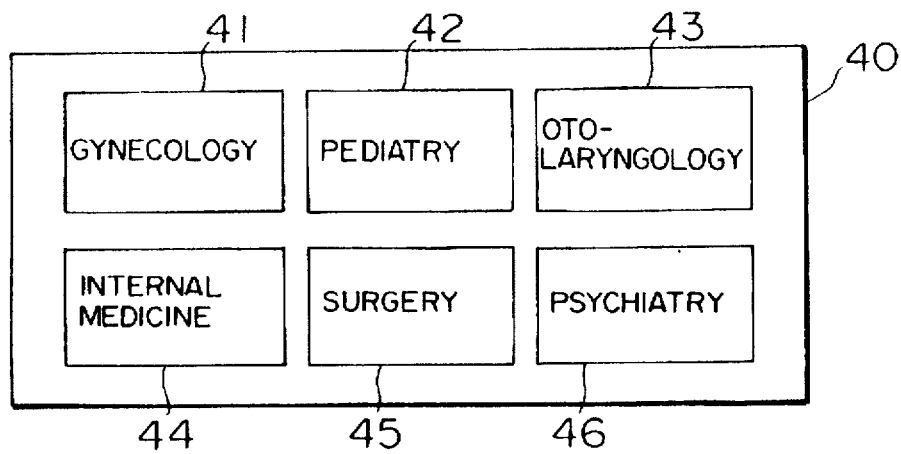
FIGS. 13A and 13B show an example of the file names displayed in the embodiment.
Figure 13B:
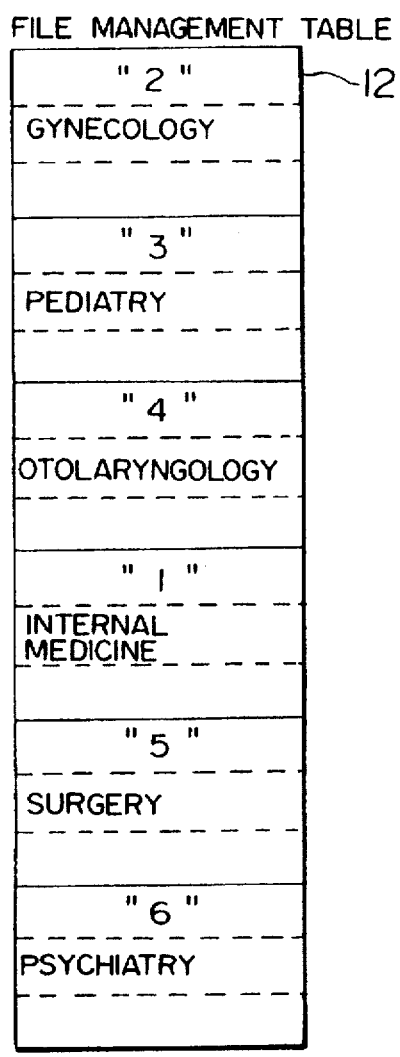

After the file location table 11 is renewed, the file names are displayed in the window 40 according to the new file location table 11 as shown in FIG. 13A. It will be seen that the file name "internal medicine" is displayed in the rectangular zone 44, and the file names "gynecology", "pediatry" and "octolaryngology" are displayed in the rectangular zones 41 to 43 respectively. At the same time, the file ID's "1" to "6" in the file management table 12 are also correspondingly changed as shown in FIG. 13B.

It will thus be seen that, in the aforementioned preferred embodiment of the present invention, the file location table 11 used for management of displaying the file names is provided independently of file management information used for management of sorting information, so that the arrangement of the file names in the file name list display information can be easily changed, and such a change in the file name arrangement does not in any way adversely affect the management of documents.

It will be understood from the foregoing description of the preferred embodiment of the present invention that the provision of the means for changing the contents of the file management table used for management of file information display is advantageous in that the arrangement of the file names in the file name list display information can be easily changed.

What is claimed is:

1. A document management system comprising:

display means for displaying a plurality of regions;

specifying means for specifying a first region and a second region from among said regions displayed by said display means;

memory means for storing information corresponding to said first region specified by said specifying means;

first shifting means for shifting said first region specified by said specifying means to a position of said second region specified by said specifying means; and second shifting means for shifting all or some of the plurality of regions not specified by the means.

2. A document management system according to claim 1, further comprising document information means for (i) storing a plurality of documents, each of the plurality of documents corresponding to one of the plurality of regions, and a file location table indicated a correspondence between said each of said plurality of documents and said each of said plurality of regions and (ii) rewriting the file location table in accordance with shifting operations performed by said first shifting means and said second shifting means.

3. A document management system comprising:

display means for displaying a plurality of closed regions;

specifying means for specifying a first closed region and a second closed region from among said closed regions displayed by said display means;

memory means for storing information corresponding to said first closed region specified by said specifying means;

first shifting means for shifting said first closed region specified by said specifying means to a position of said second closed region specified by said specifying means; and second shifting means for shifting all or some of the plurality of closed regions not specified by the first shifting means in accordance with the first closed region and the second closed region selected by the selecting means.

4. A document management system according to claim 3, further comprising document information storing means for (i) storing a plurality of documents, each of the plurality of documents corresponding to one of the plurality of closed regions, and a file location table indicating a correspondence between said each of said plurality of documents and said each of said plurality of closed regions and (ii) rewriting the file location table in accordance with shifting operations performed by said first shifting means and said second shifting means.

5. A document management system comprising:

display means for displaying a plurality of regions;

specifying means for specifying a first region and a second region from among said regions displayed by said display means;

memory means for storing information corresponding to said fist region specified by said specifying means;

first shifting means for shifting said first region specified by said specifying means to a position of said second region specified by said specifying means; and second shifting means for shifting a third region located between said first region specified by said specifying means and said second region specified by said specifying means and also shifting said second region specified by said specifying means.

6. A document management system according to claim 5, wherein, when an address of said first region specified by said specifying means is smaller than an address of said second region specified by said specifying means, regions whose addresses are located between the address of said first region specified by said specifying means and the address of said second region specified by said specifying means and also said second region specified by said specifying means are shifted in a one-address decreasing direction.

7. A document management system according to claim 5, wherein, when an address of said first region specified by said specifying means is larger than an address of said second region specified by said specifying means, regions whose addresses are located between the address of said first region specified by said specifying means and the address of said second region specified by said specifying means and also the second region specified by said specifying means are shifted in a one-address increasing direction.

8. A document management system according to claim 5, further comprising document information storing means for (i) storing a plurality of documents, each of the plurality of documents corresponding to one of the plurality of regions, and a file location table indicating a correspondence between said each of said plurality of documents and said each of said plurality of regions and (ii) rewriting the file location table in accordance with shifting operations performed by said first shifting means and said shifting means.

* * * * *